United States Patent
Tomioka

(10) Patent No.: US 11,331,745 B2
(45) Date of Patent: May 17, 2022

(54) DISTANCE MEASURING DEVICE, FRICTION STIR WELDING APPARATUS, AND FRICTION STIR WELDING METHOD

(71) Applicant: Kabushiki Kaisha Toshiba, Minato-ku (JP)

(72) Inventor: Taizo Tomioka, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 111 days.

(21) Appl. No.: 16/740,527

(22) Filed: Jan. 13, 2020

(65) Prior Publication Data

US 2020/0246908 A1 Aug. 6, 2020

(30) Foreign Application Priority Data

Feb. 1, 2019 (JP) .............................. JP2019-016735
Dec. 17, 2019 (JP) .............................. JP2019-227287

(51) Int. Cl.
 *B23K 20/12* (2006.01)

(52) U.S. Cl.
 CPC ........ *B23K 20/123* (2013.01); *B23K 20/1255* (2013.01)

(58) Field of Classification Search
 CPC .............. B23K 20/128; B23K 20/1215; B23K 20/1225; B23K 20/1255; B23K 20/126; B23K 20/122; B23K 20/1245; B23K 20/129; B23K 20/1205; B23K 2101/18; B23K 20/1235; B23K 20/1275; B23K 20/1295; B23K 20/22; B23K 2101/006; B23K 2103/10; B23K 20/123; B23K 20/124; B23K 20/125; B23K 20/1265; B23K 20/2275; B23K 20/2333; B23K 20/2336; B23K 20/24; B23K 2101/045; B23K 2101/28; B23K 2103/02; B23K 2103/04; B23K 2103/05; B23K 2103/08;
 (Continued)

(56) References Cited

U.S. PATENT DOCUMENTS 10,596,657 B2 * 3/2020 Odakura .............. B23K 20/124
2003/0047584 A1 3/2003 Okamoto et al.
(Continued)

FOREIGN PATENT DOCUMENTS

JP 3314706 B2 8/2002
JP 4199446 B2 12/2008
(Continued)

*Primary Examiner* — Erin B Saad
(74) *Attorney, Agent, or Firm* — Oblon, McClelland, Maier & Neustadt, L.L.P.

(57) ABSTRACT

The abutment portion touches with a shoulder surface of a joining tool for friction stir welding. The tip portion is freely movable in a first direction connecting a surface of the workpiece and the shoulder surface in a state of contacting the surface of the workpiece. The detector is configured to detect a position of the tip portion in the first direction. The output unit is configured to output a data of the position of the tip portion in the first direction detected by the detector. The controller is configured to calculate a position of the tip portion to the abutment portion from the data of the position output from the output unit, and to calculate a distance between the shoulder surface of the joining tool and the surface of the workpiece.

8 Claims, 4 Drawing Sheets

(58) Field of Classification Search
CPC .......... B23K 2103/12; B23K 2103/14; B23K 2103/15; B23K 2103/18; B23K 2103/20; B23K 2103/22; B23K 2103/24; B23K 2103/26; B23K 2201/18; B23K 2203/10; B23K 26/34; B23K 37/0408; B23K 9/042
See application file for complete search history.

(56) References Cited

U.S. PATENT DOCUMENTS

| | | | |
|---|---|---|---|
| 2010/0243714 A1* | 9/2010 | Allehaux | B23K 20/1235 228/104 |
| 2012/0006883 A1 | 1/2012 | Nishida | |
| 2012/0279442 A1* | 11/2012 | Creehan | C23C 24/06 118/76 |
| 2014/0034709 A1 | 2/2014 | Oki et al. | |
| 2014/0231490 A1* | 8/2014 | Sato | B23K 20/123 228/2.1 |
| 2015/0273623 A1* | 10/2015 | Kato | B23K 20/125 228/112.1 |
| 2016/0175981 A1* | 6/2016 | Kandasamy | B23K 20/1245 228/114.5 |
| 2016/0221116 A1* | 8/2016 | Kato | B23K 20/122 |
| 2017/0304933 A1* | 10/2017 | Miles | B23K 9/042 |
| 2017/0304934 A1* | 10/2017 | Carlson | B23K 20/1265 |
| 2018/0085849 A1* | 3/2018 | Kandasamy | B23K 20/128 |
| 2018/0297146 A1 | 10/2018 | Tomioka | |
| 2020/0189025 A1* | 6/2020 | Rodriguez | B23K 20/128 |
| 2020/0331203 A1* | 10/2020 | Verma | B23K 20/1225 |

FOREIGN PATENT DOCUMENTS

| | | |
|---|---|---|
| JP | 4252403 B2 | 4/2009 |
| JP | 4382504 B2 | 12/2009 |
| JP | 4640548 B2 | 3/2011 |
| JP | 6040352 B2 | 12/2016 |
| WO | WO 2018/029973 A1 | 2/2018 |

* cited by examiner

DISTANCE MEASURING DEVICE, FRICTION STIR WELDING APPARATUS, AND FRICTION STIR WELDING METHOD

CROSS-REFERENCE TO RELATED APPLICATIONS

This application is based upon and claims the benefit of priority from Japanese Patent Application No. 2019-016735, filed on Feb. 1, 2019, and Japanese Patent Application No. 2019-227287, filed on Dec. 17, 2019; the entire contents of all of which are incorporated herein by reference.

FIELD

Embodiments described herein relate generally to a distance measuring device, a friction stir welding apparatus, and a friction stir welding method.

BACKGROUND

In friction stir welding (FSW), it is important to control the insertion depth of the shoulder surface of the joining tool into the workpiece. In particular, long workpieces have a large variation in surface height, and the workpiece surface shape of the joint line is measured before FSW and the tool height during joining is changed. For this reason, it may take a long time from setting to joining.

As methods for controlling the amount of pushing of the shoulder surface of the joining tool into the workpiece with surface height variation, a method of measuring the workpiece height using laser light, a method of controlling the height of the joining so that the load falls within a prescribed range by detecting torque fluctuation in the motor that rotates the joining tool, and a method of controlling the height of the worktable so that the load applied to the joining tool is constant by supporting the worktable by a cylinder are known.

DETAILED DESCRIPTION

Figure 1:
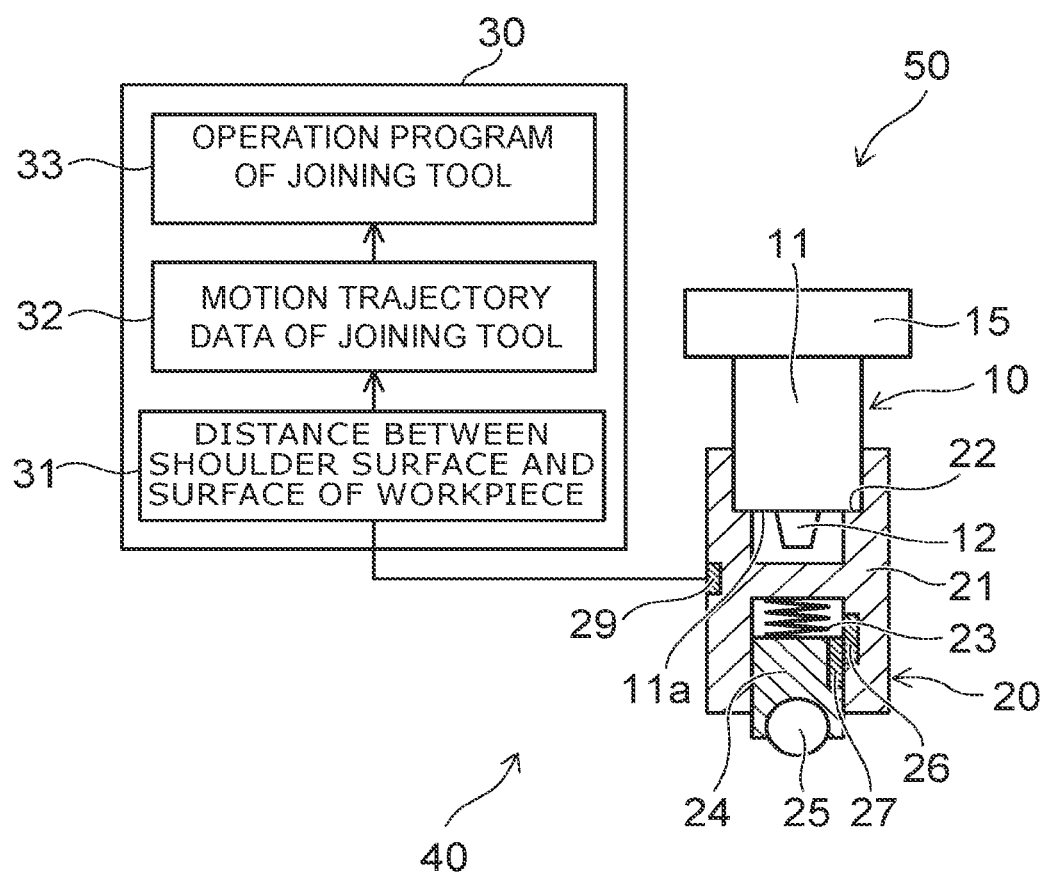
FIG. 1 is a schematic view of a friction stir welding apparatus according to an embodiment of the invention.

When using the method of measuring the workpiece height using laser beam to control the amount of pushing of the shoulder surface of the joining tool into the workpiece with surface height variation, there is a problem that it is necessary to use a laser beam measuring device, and the apparatus and adjustment become complicated or the cost becomes high. In the method of controlling the height of the joining tool so that the load falls within a prescribed range by detecting torque fluctuation in the motor that rotates the joining tool, and the method of controlling the height of the worktable so that the load applied to the joining tool is constant by supporting the worktable by a cylinder, there is a problem that detection of the torque fluctuation becomes difficult in the case of using the joining tool having a small diameter.

The embodiment of the invention provides a distance measuring device, a friction stir welding apparatus and a friction stir welding method which are possible to make high quality joining also for the workpiece with large variation in surface height.

According to one embodiment, a distance measuring device includes a measuring tool and a controller. The measuring tool includes an abutment portion, a tip portion, a detector, and an output unit. The abutment portion touches with a shoulder surface of a joining tool for friction stir welding. The tip portion is freely movable in a first direction connecting a surface of the workpiece and the shoulder surface in a state of contacting the surface of the workpiece. The detector is configured to detect a position of the tip portion in the first direction. The output unit is configured to output a data of the position of the tip portion in the first direction detected by the detector. The controller is configured to calculate a position of the tip portion to the abutment portion from the data of the position output from the output unit, and to calculate a distance between the shoulder surface of the joining tool and the surface of the workpiece.

Various embodiments are described below with reference to the accompanying drawings. In the drawings, the same components are marked with the same reference numbers, and detailed description will be omitted as appropriate.

The drawings are schematic, and the relationships between the thickness and width of portions, the proportions of sizes among portions, etc., are not necessarily the same as the actual values. The dimensions and proportions may be illustrated differently among drawings, even for identical portions.

FIG. 1 is a schematic view of a friction stir welding apparatus 50 according to the embodiment of the invention.

The friction stir welding apparatus 50 includes a joining tool 10 and a distance measuring device 40. The distance measuring device 40 includes a distance measuring tool 20 and a controller 30.

The joining tool 10 includes, for example, a cylindrical shank 11 and a probe pin 12. A shoulder surface 11a is formed on one end in an axial direction of the shank 11. The probe pin 12 protruding from the shank 11 in the axial direction is provided at the center of the shoulder surface 11a. At least one of the probe pin 12 or the shoulder surface 11a is made of a material harder than the workpiece to be joined.

The joining tool 10 is held by a tool holder 15. The tool holder 15 is connected to a rotation mechanism, and the joining tool 10 is driven to rotate with the central axis of the shank 11 as a rotation axis, for example.

The distance measuring tool 20 includes a main body 21, a movable portion 24, a tip portion 25, detectors 26 and 27, and an output unit 29. The main body 21 has an abutment portion 22 touching with the shoulder surface 11a of the joining tool 10. The main body 21 is fixed to the joining tool 10 in a state where the abutment portion 22 is brought into contact with the shoulder surface 11a of the joining tool 10.

The movable portion 24 is connected to the main body 21 via the connecting portion 23. Due to the expansion and contraction of the connecting portion 23, the movable portion 24 is freely movable with respect to the main body 21 fixed to the joining tool 10, for example, in the axial direction of the shank 11. The connecting portion 23 is, for example, a spring or an electric actuator.

The main body 21 includes the detector 26. The movable portion 24 includes the detector 27. The detectors 26 and 27 detect Z-position of the movable portion 24 to the main body 21. The Z-position is a position of the tip portion 25 of the movable portion 24 in a first direction connecting the surface of the workpiece and the shoulder surface 11a of the joining tool 10. The detectors 26 and 27 are, for example, non-contact position sensor. The measuring tool 20 includes the output unit 29 outputting the Z-position data detected by the detectors 26 and 27 to the controller 30.

A tip portion 25 is provided at a tip of the movable portion 24. The tip portion 25 is freely movable together with the movable portion 24 in the first direction connecting the surface of the workpiece and the shoulder surface 11a in a state of being in contact with the surface of the workpiece. The tip portion 25 is a rotating body, more specifically, a sphere.

The controller 30 is electrically connected to the distance measuring tool 20. The controller 30 includes a distance calculation unit 31. The distance calculation unit 31 calculates the position of the tip portion 25 to the abutment portion 22 based on the Z-position data of the tip portion 25 output from the output unit 29 of the measuring tool 20, and calculates the distance between the shoulder surface 11a of the joining tool 10 and the surface of the workpiece. The controller 30 instructs the output unit 29 of the measuring tool 20 to output the Z-position data for any moving distance of the joining tool 10. The controller 30 includes a calculation unit 32. The calculation unit 32 associates X-coordinate (coordinate in a second direction crossing the first direction) and Y-coordinate (coordinate in a third direction crossing the first direction) on the measuring tool 20 and the distance between the shoulder surface 11a and the surface of the workpiece output from the distance calculation unit 31. And the calculation unit 32 calculates the motion trajectory of the joining tool 10 for the shoulder surface 11a of the joining tool 10 to be pushed into the workpiece at a preset depth in the range from the joining start point to the joining end point. The controller 30 includes an operation program creating unit 33. The operation program creating unit 33 creates an operation program of the friction stir welding apparatus to realize the motion trajectory.

Next, a friction stir welding method using the friction stir welding apparatus 50 will be described.

Figure 2:
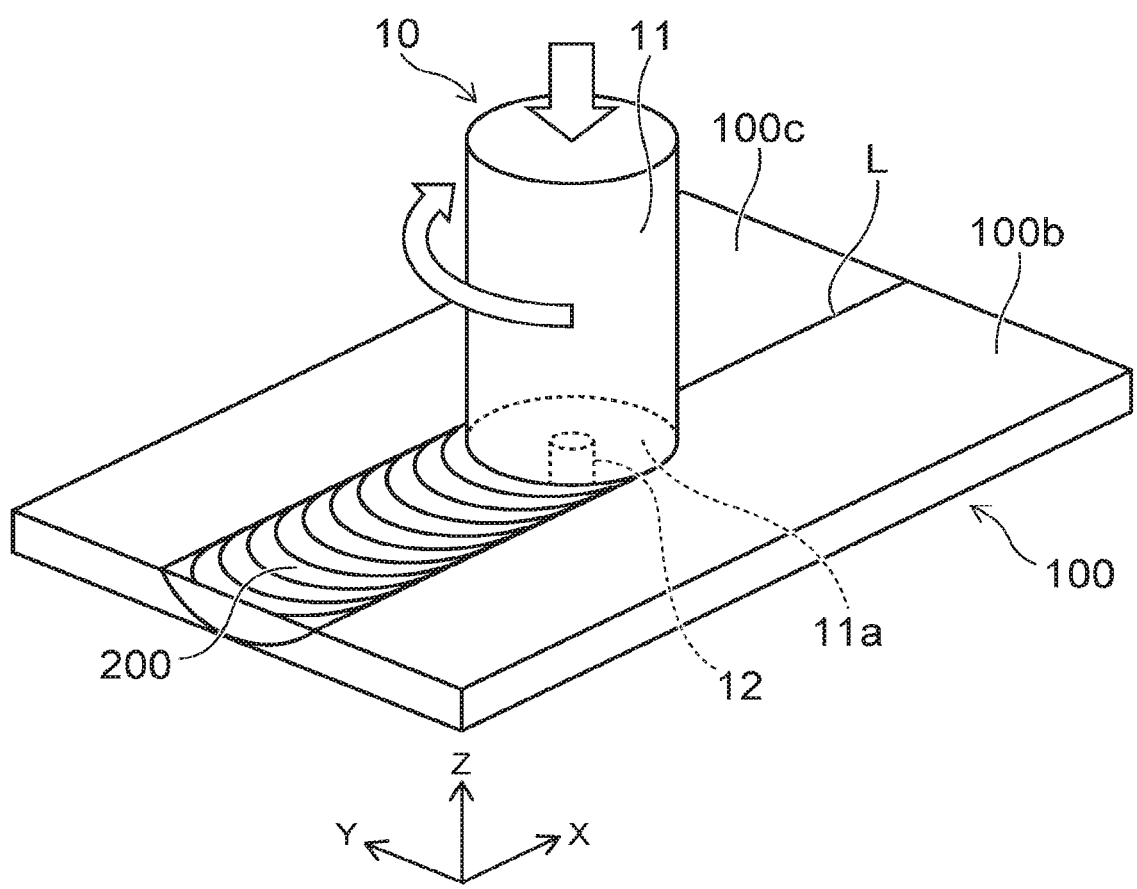
FIG. 2 is a schematic view showing a friction stir welding method according to the embodiment of the invention.

As shown in FIG. 2, the side surfaces of two workpieces 100b, 100c (for example, which may be simply referred to as "100" hereinafter) that are the objects to be joined are butted with each other, and the workpieces 100b, 100c are supported on the stage. In FIG. 2, two directions parallel to the surface of the workpiece 100 and perpendicular to each other are defined as an X direction and a Y direction. A direction (thickness direction of the workpiece 100) orthogonal to the X direction and the Y direction is defined as a Z direction. The first direction connecting the surface of the workpiece 100 and the shoulder surface 11a of the joining tool 10 corresponds to the Z-direction. In this embodiment, Z direction (the thickness direction perpendicular to the X-Y plane or the surface of the workpiece 100) may also be referred to as a "vertical direction", and a direction perpendicular to the Z direction, i.e. a direction parallel to the X-Y plane or the surface of the workpiece 100, may also be referred to as a "horizontal direction", even if the workpiece 100 is not horizontally provided with respect to the gravity direction.

The joining tool 10 is inserted into the surface of the butted portion of the two workpieces 100b and 100c while rotating at a high speed. The probe pin 12 is completely inserted into the workpiece 100, and the shoulder surface 11a is pushed into the surface of the workpiece 100 by a prescribed amount. Then, the rotating joining tool 10 is moved along the butted portion (joining line L) of the workpiece 100, and frictional heat between the joining tool 10 and the workpiece 100 generated at this time and stirring of the material are used. Two works 100b and 100c are joined. The butted surface disappears at a joining portion 200 between the two workpieces 100b and 100c.

The joining tool 10 may be moved relatively to the workpiece 100 along the joining line L, the joining tool 10 may be moved to the stationary workpiece 100, or the workpiece 100 may be moved to the stationary joining tool 10. Alternatively, the joining tool 10 and the workpiece 100 may be moved in opposite directions.

Here, especially in the case of a long workpiece having a long region to be joined, in which the surface is likely to be wavy or to have a variation in height, it is important to control the amount of pushing of the shoulder surface 11a of the joining tool 10 into the workpiece. If the amount of pushing of the shoulder surface 11a onto the workpiece surface is insufficient, a joining failure due to insufficient frictional heat is caused, and if the shoulder surface 11a is excessively pushed into the workpiece surface, excessive burrs are likely to occur at the joining portion.

Therefore, according to the embodiment, the distance between the workpiece surface and the shoulder surface 11a at the site to be joined is measured before joining using the distance measuring device 40 described above.

Figure 3:
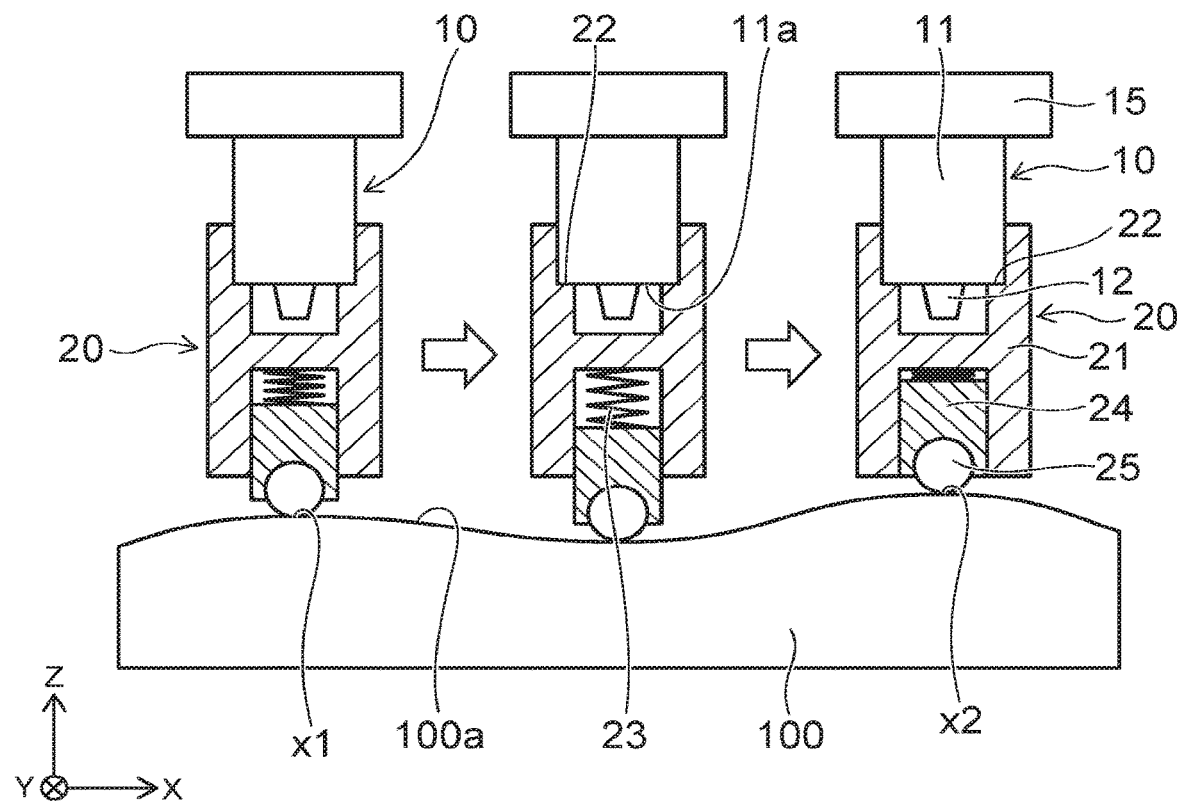
FIG. 3 is a schematic view showing a measuring method of a distance between the shoulder surface of the joining tool and the work surface using a measuring tool according to the embodiment of the invention.

As shown in FIG. 3, the measuring tool 20 is installed on the joining tool 10. The abutment portion 22 formed on the main body 21 of the measuring tool 20 is touched with the shoulder surface 11a of the joining tool 10.

After installing the measuring tool 20 on the joining tool 10, the tip portion 25 of the measuring tool 20 is brought into contact with the joining start point x1 of the surface 100a of the workpiece 100. Then, with the tip portion 25 brought into contact with the surface 100a of the workpiece 100 and the setting value on the measuring tool of the height of the welding tool 10 (position in the Z direction) being constant, the joining tool 10 on which the measuring tool 20 is installed is substantially horizontally moved from the joining start point x1 to the joining end point x2 of the workpiece 100 along the site to be joined (joining line) of the workpiece 100. The joining tool 10 and the distance measuring device 40 are not rotated.

As the joining tool 10 moves, the tip portion 25 that is a sphere moves while rolling on the surface 100a of the workpiece 100. Following the variation of the distance between the surface 100a of the workpiece 100 and the shoulder surface 11a of the joining tool 10, the connecting portion 23 expands and contracts, and the movable portion 24 moves in the first direction connecting the surface 100a of the workpiece 100 and the shoulder surface 11a. For example, the movable portion 24 moves up and down.

During the movement of the joining tool 10 from the joining start point x1 to the joining end point x2, the controller 30 shown in FIG. 1 detects the position of the tip portion 25 to the abutment portion 22. The position may be detected continuously from the joining start point x1 to the joining end point x2. Or, the position may be detected for any moving distance of the joining tool 10. When the position is detected for any moving distance of the joining tool 10, the x-coordinate and the y-coordinate of the position of the joining tool 10 are determined by the controller 30. When the joining tool 10 moves to the measurement position, the controller 30 detects the position of the tip portion 25 to the abutment portion 22 and acquires the position as data. From this detection result, the distance between the shoulder surface 11a and the surface 100a of the workpiece 100 is calculated in association with the position (x-coordinate, y-coordinate) of the site to be joined between the joining start point x1 and the joining end point x2.

Further, the controller 30 creates motion trajectory data of the joining tool 10 from the distance between the shoulder surface 11a and the surface 100a of the workpiece 100. For example, the motion trajectory data associates the position (x-coordinate, y-coordinate) of the site to be joined between the joining start point x1 and the joining end point x2 and the height (z-coordinate) of the joining tool 10.

The controller 30 creates an operation program for the joining tool 10 based on the operation trajectory data. And the measuring tool 20 is removed from the joining tool 10, and the friction stir welding of the workpiece 100 is performed with the joining tool 10 according to the operation program described above.

Figure 4:
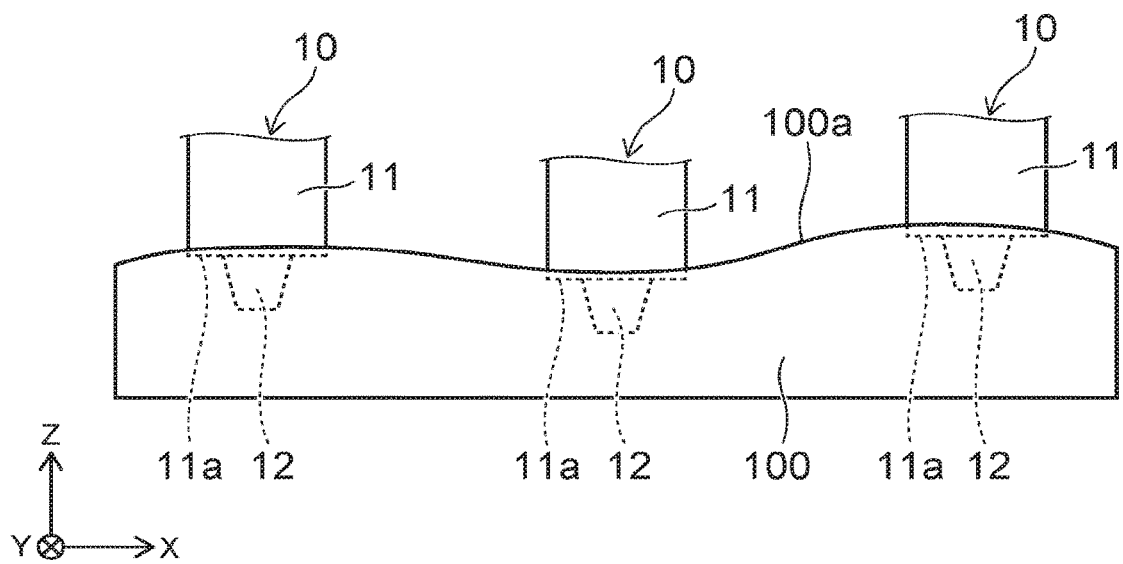
FIG. 4 is a schematic view showing the friction stir welding method according to the embodiment of the invention.

That is, as shown in FIG. 4, while the probe pin 12 of the joining tool 10 is inserted into the site to be joined of the workpiece 100 and the shoulder surface 11a is pushed into the surface of the site to be joined, the joining tool 10 is moved from the joining start point x1 to the joining end point x2 while rotating.

Based on the motion trajectory data, the position of the joining tool 10 in the direction (Z direction) orthogonal to the moving direction along the site to be joined is controlled, and the amount of pushing of the shoulder surface 11a into the site to be joined is controlled within a prescribed range.

For example, when the outer diameter of the shoulder surface 11a is 10 mm and the length of the probe pin 12 is 3 mm, the amount of pushing of the shoulder surface 11a into the site to be joined is controlled within a range of 0.2 mm plus or minus 0.05 mm. More precise control of the amount of pushing is required for a thin workpiece to be joined. For example, when the thickness of the workpiece is 0.5 mm, the outer diameter of the shoulder surface 11a is 3 mm, and the length of the probe pin 12 is 0.4 mm, the amount of pushing of the shoulder surface 11a into the site to be joined is controlled within a range of 0.05 mm plus or minus 0.01 mm.

According to the embodiment, it is possible to appropriately control the amount of pushing of the shoulder surface 11a into the site to be joined even for the workpiece 100 having a variation in surface height, and high-quality joining can be performed.

For example, without using an expensive laser light measurement device such as a method of measuring the workpiece height using laser light, according to the embodiment, the distance between the shoulder surface 11a and the surface 100a of the workpiece 100 can be measured in a short time with a simple and low-cost contact-type measuring tool.

Examples of a method for controlling the amount of pushing of the shoulder surface of the joining tool into a workpiece having a variation in surface height include the following methods. One method is a method of detecting the torque fluctuation of a motor that rotates the joining tool and controlling the height of the joining tool so that the load falls within a prescribed range. Another method is a method in which the work table is supported by a cylinder and the height of the work table is controlled so that the load applied to the joining tool is constant. When these methods control the amount by which the shoulder surface of the joining tool is pushed into the workpiece having variations in surface height, the small-diameter joining tool makes it difficult to detect load fluctuations. In contrast, according to the embodiment, high-quality friction stir welding can be performed even when a small-diameter joining tool is used.

The site to be joined (butted portion between the two workpieces) is not limited to a linear shape, and the joining surface may be a curved surface. Therefore, the movement trajectory of the joining tool 10 that moves along the site to be joined is not limited to a straight line, and may be a curved line.

Further, the tip portion 25 that moves on the surface 100a while being in contact with the surface 100a of the workpiece 100 is not limited to a sphere but may be a rotating body such as a roller. Furthermore, the tip portion 25 may be configured not to rotate. In this case, the surface 100a of the workpiece 100 may be bent by friction between the tip portion 25 and the surface 100a of the workpiece 100.

Figure 5:
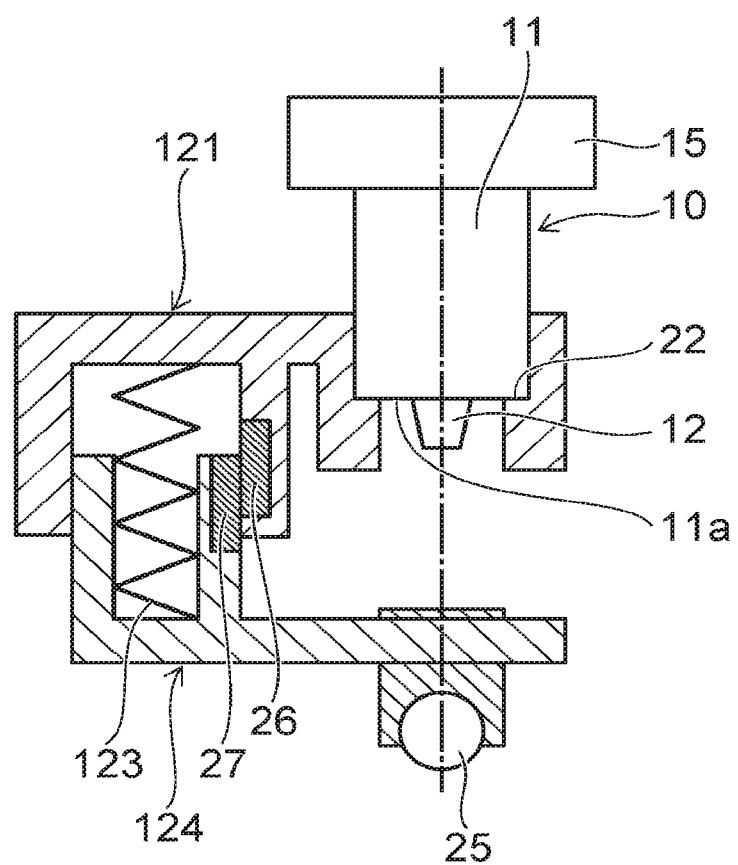
FIG. 5 is a schematic view of another example of the measuring tool according to the embodiment of the invention.

FIG. 1 shows an example in which the measuring tool 20 is arranged coaxially with the joining tool 10. As shown in FIG. 5, the tip portion 25 touching the workpiece may be arranged coaxially with the joining tool 10, and the movable portion 124 connected to the tip portion 25 may be offset from the joining tool 10. In this embodiment shown in FIG. 5, the same friction stir welding as in the above-described embodiment can be performed. The movable portion 124 is connected to the main body 121 fixed to the joining tool 10 via the connecting portion 123, and is freely movable with in the axial direction of the shank 11. The connecting portion 123 is, for example, a spring or an electric actuator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A distance measuring device, comprising:
a measuring tool including an abutment portion, a tip portion, a detector, and an output unit, the abutment portion touching with a shoulder surface of a joining tool for friction stir welding, the tip portion being freely movable in a first direction connecting a surface of the workpiece and the shoulder surface in a state of contacting the surface of the workpiece, the detector configured to detect a position of the tip portion in the first direction, the output unit configured to output a data of the position of the tip portion in the first direction detected by the detector; and
a controller configured to calculate a position of the tip portion to the abutment portion from the data of the position output from the output unit, and to calculate a distance between the shoulder surface of the joining tool and the surface of the workpiece.

2. The device according to claim 1, wherein the tip portion is a rotating body.

3. The device according to claim 2, wherein the tip portion is a ball.

4. The device according to claim 1, wherein
the controller includes circuitry configured to:

calculate a motion trajectory of the joining tool from the data of the position output from the output unit, from a coordinate of the measuring tool in a second direction, and from a coordinate of the measuring tool in a third direction, the second direction and the third direction crossing the first direction, and control the joining tool based on the motion trajectory.

5. A friction stir welding apparatus, comprising:

a joining tool for friction stir welding; and a distance measuring device, the distance measuring device including a distance measuring tool including an abutment portion, an tip portion, a detector, and an output unit, the abutment portion touching with a shoulder surface of the joining tool, the tip portion being freely movable in a first direction connecting a surface of the workpiece and the shoulder surface in a state of contacting the surface of the workpiece, the detector configured to detect a position of the tip portion in the first direction, the output unit configured to output a data of the position of the tip portion in the first direction detected by the detector, and a controller configured to calculate a position of the tip portion to the abutment portion from the data of the position output from the output unit, and to calculate a distance between the shoulder surface of the joining tool and the surface of the workpiece.

6. The apparatus according to claim 5, wherein the tip portion is a rotating body.

7. The apparatus according to claim 6, wherein the tip portion is a ball.

8. The device according to claim 5, wherein the controller includes circuitry configured to:

calculate a motion trajectory of the joining tool from the data of the position output from the output unit, from a coordinate of the measuring tool in a second direction, and from a coordinate of the measuring tool in a third direction, the second direction and the third direction crossing the first direction, and control the joining tool based on the motion trajectory.

* * * * *